United States Patent
Lee et al.

(10) Patent No.: US 6,947,024 B2
(45) Date of Patent: Sep. 20, 2005

(54) APPARATUS AND DRIVING LAMP AND LIQUID CRYSTAL DISPLAY DEVICE HAVING THE SAME

(75) Inventors: Inn-Sung Lee, Gyeonggi-do (KR); Moon-Shik Kang, Gueonggi-do (KR); Song-Yi Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 10/273,837

(22) Filed: Oct. 18, 2002

(65) Prior Publication Data

US 2003/0142060 A1 Jul. 31, 2003

(30) Foreign Application Priority Data

Jan. 31, 2002 (KR) .................................... 10-2002-5731

(51) Int. Cl.[7] ................................................. G09G 3/36
(52) U.S. Cl. ...................................... 345/102; 315/291
(58) Field of Search ........................ 345/102; 315/291, 315/294, 295, 300, 302, 306

(56) References Cited

U.S. PATENT DOCUMENTS 5,854,617 A * 12/1998 Lee et al. .................... 345/102
6,153,987 A * 11/2000 Toda et al. ................... 315/308
6,424,100 B1 * 7/2002 Kominami et al. ......... 315/307

* cited by examiner

Primary Examiner—Jimmy H. Nguyen
(74) Attorney, Agent, or Firm—Cantor Colburn LLP

(57) ABSTRACT

Disclosed is a liquid crystal display device having a lamp driving apparatus for preventing lamps from being damaged due to electric current variation among the lamps. A DC/DC converter converts an externally provided DC voltage input into a converted DC voltage signal having a predetermined voltage level. A DC/AC inverter inverts the converted DC voltage signal into an AC voltage signal to supply the inverted AC voltage signal to an input terminal of a lamp. A power controller detects electric current flowing the lamp at an output terminal of the lamp to control the level of the inverted AC voltage signal output from the DC/AC inverter and bypasses a part of electric current applied to the input terminal of the lamp when a level of the detected electric current is higher than a predetermined threshold value. Therefore, when the level of the electric current flowing through the lamp exceeds the predetermined threshold value, the power controller bypasses the part of the electric current supplied to the lamp to the ground, thereby decreasing the amount of the electric current supplied to the lamp and preventing the lamp from being damaged.

19 Claims, 3 Drawing Sheets

APPARATUS AND DRIVING LAMP AND LIQUID CRYSTAL DISPLAY DEVICE HAVING THE SAME

BACKGROUND OF THE INVENTION

1. Field of the Invention

The present invention relates to a liquid crystal display device, and more particularly to a lamp driving apparatus for preventing damages to a lamp caused by electric current variation due to characteristics of the lamp.

2. Description of the Related Art

In general, the liquid crystal display (hereinafter, referred to as "LCD") is broadly classified into reflection type LCD and transmission type LCD. A reflection type LCD device displays an image by reflecting the light externally provided to an LCD panel, and a transmission type LCD device displays an image with the light generated from a backlight assembly disposed under an LCD panel.

The backlight assembly for a LCD device includes a lamp unit which emits light, a light guide plate which guides the light emitted from the lamp unit toward an LCD panel, an optical sheet such as a diffusion sheet, and prism sheet or the like which increases brightness of the light from the light guide plate.

The lamp unit includes a lamp used as a light source of the LCD device, a reflection plate that reflects the light from the lamp to increase the light efficiency of the light emitted from the lamp, and an inverter electrically connected to the lamp to apply power thereto.

Recently, LCD devices that are lighter and smaller than a CRT (cathode ray tube) type display apparatus have been developed. Such LCD devices also have functions such as full color and high resolution. Owing to such advantages, the liquid crystal display devices are widely used for computer monitors, television receivers, and other display devices.

In the LCD technology, the brightness for an LCD device is important in terms of the display quality and efficiency. Particularly, the LCD devices require multiple lamps due to enlargement of the LCD panel. In general, a large size LCD device employs a plurality of lamps disposed under a diffusion sheet, which emit the light directly illuminated onto an LCD panel.

In an edge type LCD device of which a plurality of lamps are disposed adjacent to side portions of a light guide plate, the plurality of lamps, that is, at least two lamps, are disposed at the side portions of the light guide plate in order to provide the light enough to display images on the large size LCD.

However, a plurality of lamps disposed at the side portions of a light guide plate are connected to one transformer installed in an inverter in parallel with the transformer. So, electric current variation occurs between the lamps due to characteristics of each of the lamps and a circuit part that controls only the sum of electric current flowing through the plurality of lamps.

In a case where the electric current is not uniformly applied to each of the lamps, one or more lamps receiving relatively larger amount of electric current are damaged. As a result, the damaged lamp(s) among the plurality of lamps arranged in parallel with each other is shut down.

In order to increase the brightness of an LCD panel, each of the lamps is set and driven with electric current having a level slightly lower than that of the maximum allowable electric current. Thus, when the electric current flowing through a lamp exceeds the maximum allowable electric current, the lifetime of the lamp that receives the excessive electric current is decreased rapidly.

Also, a lamp that receives relatively larger amount of electric current becomes rapidly weakened even though the electric current does not exceed the maximum allowable electric current.

Moreover, in a case where at least three lamps are disposed at opposite side portions of the light guide plate, since the distance between each of the three lamps and a reflection plate of the lamp is different from each other, the leakage current and the electric current variations of the three lamps occur.

BRIEF SUMMARY OF THE INVENTION

The present invention provides a lamp driving apparatus for preventing lamps from being damaged due to variation of electric current flowing through the lamps connected in parallel with each other, and also provides a liquid crystal display having the lamp driving apparatus.

As an exemplary embodiment of the present invention, there is provided an apparatus for driving a lamp. In the apparatus, a DC/DC converter converts an externally provided DC input signal into a converted DC signal having a voltage level to. A DC/AC inverter inverts the converted DC signal into an AC signal to supply the inverted AC signal to an input terminal of a lamp. A power controller detects electric current at an output terminal of the lamp to generate a feedback signal to control the voltage level of the converted DC signal output from the DC/DC converter and bypasses a part of the inverted AC signal applied to the input terminal of the lamp when a level of the detected electric current is higher than a predetermined threshold value.

The power controller includes an electric current detecting part for detecting the electric current at the output terminal of the lamp, the electric current detecting part having a first terminal connected to the output terminal f the lamp, a second terminal outputting the feedback signal to the DC/DC converter, and a third terminal outputting a detecting signal indicating that the detected electric current level is higher than the predetermined threshold value; and a bypassing part for bypassing the part of the inverted AC signal supplied to the input terminal of the lamp in response to the detecting signal from the electric current detecting part.

The bypassing part has a first resistor connected between the input terminal of the lamp and ground; and a switching part connected between the input terminal of the lamp and the ground, for bypassing the part of the inverted AC signal supplied to the input terminal of the lamp to the ground in response to the detecting signal from the electric current detecting part.

The bypassing part further includes a second resistor of which a first terminal is connected to the electric current detecting part and a second terminal is connected to the switching part. The bypassing part may further include a third resistor of which a first terminal is connected to the second terminal of the second resistor and a second terminal is connected to the ground.

The switching part includes a transistor having an electric conduction path between the input terminal of the lamp and the ground, which is turned on or off in response to the detecting signal from the electric current detecting part.

As another exemplary embodiment of the present invention, there is provided a liquid crystal display device in which a liquid crystal display panel has a plurality of data lines, a plurality of gate lines, switching devices respectively connected to the plurality of data and gate lines, and a liquid crystal device connected to the switching devices, for displaying an image. A plurality of lamps provide the liquid crystal display panel with light, and a lamp driving part converts a voltage level of an externally supplied input signal to provide a converted signal to the plurality of lamps, and bypasses an excessive part of the converted signal provided to the plurality of lamps to prevent the plurality of lamps from being damaged by the excessive part.

The lamp driving part includes a power converter for converting a DC signal into an AC signal to supply the converted AC signal to an input terminal of each of the plurality of lamps; and a power controller for detecting electric current at an output terminal of a lamp to control the level of the converted AC signal output from the power converter and bypassing a part of the converted AC signal applied to the input terminal of the lamp when a level of the detected electric current is higher than a predetermined threshold value.

The power controller has an electric current detecting part for detecting the electric current at the output terminal of the lamp, the electric current detecting part having a first terminal connected to the output terminal of the lamp, a second terminal outputting a feedback signal to the DC/DC converter to control the converted voltage level of the converted DC signal, and a third terminal outputting a detecting signal indicating that the detected electric current level is higher than the predetermined threshold value; and a bypassing part for bypassing the part of the inverted AC signal supplied to the input terminal of the lamp in response to the detecting signal from the electric current detecting part.

The bypassing part includes a first resistor of which one terminal is connected to the input terminal of the lamp; and a switching part for bypassing the part of the inverted AC signal supplied to the input terminal of the lamp to the ground through the first resistor in response to the detecting signal from the electric current detecting part.

The bypassing part may further include a second resistor of which a first terminal is connected to the electric current detecting part and a second terminal is connected to the switching part, and a third resistor of which a first terminal is connected to the second terminal of the second resistor and a second terminal is connected to the ground.

According to the liquid crystal display apparatus, when electric current flowing through the lamps exceeds a predetermined threshold value, a part of the electric current supplied to the lamps is bypassed to the ground, thereby decreasing the amount of the electric current supplied to the lamps and preventing the lamps from being damaged.

BRIEF DESCRIPTION OF THE DRAWINGS

The present invention will become more apparent by describing in detail exemplary embodiments thereof with reference to the accompanying drawings, in which.

DETAILED DESCRIPTION OF INVENTION

Reference will now be made in detail to the exemplary embodiments of the present invention, examples of which are illustrated in the accompanying drawings.

Figure 1:
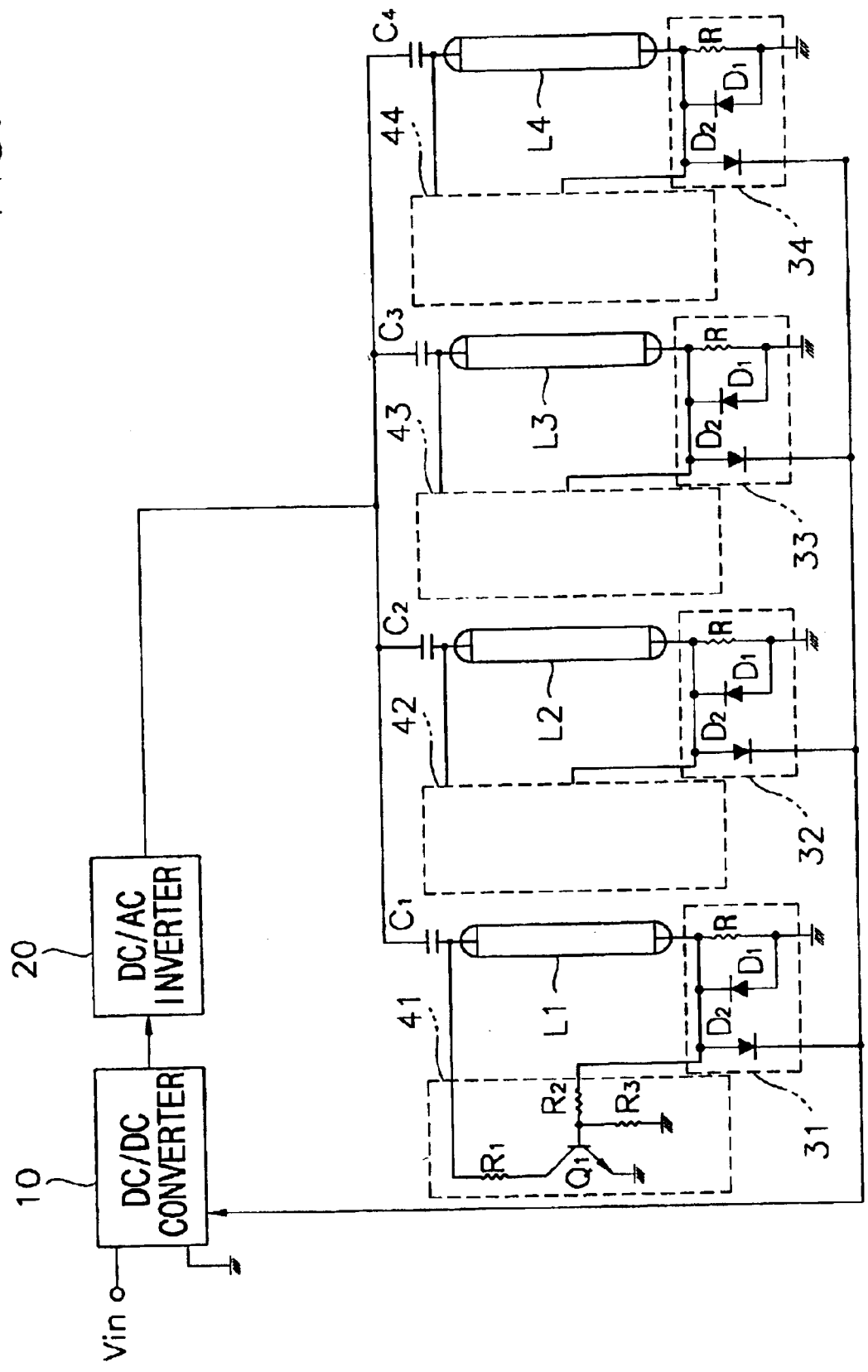
FIG. 1 is a block diagram showing an apparatus for driving lamps of a liquid crystal display device in accordance with an embodiment of the present invention.

FIG. 1 is a block diagram showing an apparatus for driving one or more lamps of a liquid crystal display in accordance with the present invention.

Referring to FIG. 1, the lamp driving apparatus includes a DC/DC converter 10, a DC/AC inverter 20, a plurality of electric current detecting parts 31, 32, 33 and 34 and a plurality of bypassing parts 41, 42, 43 and 44, and supplies predetermined electric current to a plurality of lamps L1, L2, L3 and L4. When electric current flowing through each of the lamps L1, L2, L3 and L4 exceeds a predetermined threshold value, the electric current detecting parts 31, 32, 33 and 34 and the bypassing parts 41, 42, 43 and 44 respectively connected to the electric current detecting parts 31, 32, 33 and 34 operate as a power consumption part, so that a part of the electric current supplied to the lamps L1, L2, L3 and L4 is consumed by the electric current detecting parts 31, 32, 33 and 34 and the bypassing parts 41, 42, 43 and 44.

The DC/DC converter 10 boosts direct current (hereinafter, referred to as "DC") externally provided and supplies the boosted DC to the DC/AC inverter 20, and the DC/AC inverter 20 inverts the boosted DC into alternating current (AC) and supplies the inverted AC to the plurality of lamps.

An input terminal of each of the plurality of lamps L1, L2, L3 and L4 is connected to corresponding one of capacitors C1, C2, C3 and C4. The plurality of lamps L1, L2, L3 and L4 emit light by receiving through the respective capacitors C1, C2, C3 and C4 the AC inverted from the boosted DC by the DC/AC inverter 20. A cold cathode fluorescent lamp (hereinafter, referred to as a "CCFL") is used for each of the lamps L1, L2, L3 and L4 in this embodiment. In general, lifetime of a CCFL is longer than that of a hot cathode fluorescent lamp (hereinafter, referred to as a "HCFL") because the cathode of a CCFL is less damaged than that of an HCFL is, by heat generated in the light emitting operation of the lamps L1, L2, L3 and L4. In addition, since the cathode of a CCFL can be made in a size smaller than that of a HCFL and the amount of heat generated from the cathode of a CCFL is smaller than that from an HCFL cathode, a CCFL may have a smaller bulb diameter than that of an HCFL. Accordingly, the CCFLs are widely used for a direct lighting type liquid crystal display apparatus.

Each of the electric current detecting parts 31, 32, 33 and 34 is connected to an output terminal of corresponding one of the lamps L1, L2, L3 and L4, and detects the electric current flowing through the corresponding one of the lamps L1, L2, L3 and L4. Also, the electric current detecting parts 31, 32, 33 and 34 provide the detected electric current to the bypassing parts 41, 42, 43 and 44 and feedback the electric current to the DC/DC converter 10.

For example, a first electric current detecting part 31 includes a resistor R connected between an output terminal of a first lamp L1 and ground in series, a first diode D1 of which cathode is connected to the output terminal of the first lamp L1 and anode is connected to the ground, and a second diode D2 of which cathode is connected to the DC/DC converter 10 and anode is connected to the output terminal of the first lamp L1.

In operation, the first electric current detecting part 31 detects the electric current output from the output terminal of the first lamp L1 and provides the DC/DC converter 10 with a signal indicating the level of the detected electric current, so that the DC/DC converter 10 controls a voltage boost range based on the detected electric current. If the level of the detected electric current exceeds a predetermined threshold value, the first electric current detecting part 31 generates an excess detecting signal to activate the first bypassing part 41. The DC/DC converter 10 controls the level of the output current in response to the signal from the first electric current detecting part 31, thereby supplying via the DC/AC inverter 20 a boosted current to the first to fourth lamps L1, L2, L3 and L4 through first to fourth capacitors C1, C2, C3 and C4, respectively.

Each of the first to fourth bypassing parts 41, 42, 43 and 44 is turned on or off in response to the excess detecting signal from corresponding one of the first to fourth electric current detecting parts 31, 32, 33 and 34, so that a part of the electric current supplied to the respective lamps L1, L2, L3 and L4 is selectively bypassed to the ground.

For example, the first bypassing part 41 includes a first resistor R1 connected to the input terminal of the first lamp L1, a second resistor R2 connected to the first electric current detecting part 31, a third resistor R3 connected between the second resistor R2 and the ground, a first transistor Q1 of which emitter is connected to the ground, base is connected to the second resistor R2 and collector is connected to the first resistor R1. When the excess detecting signal is input from the first electric current detecting part 31 to the first bypassing part 41 through the second resistor R2, the first transistor Q1 is turned on so that a part of the electric current supplied to the first lamp L1 is bypassed to the ground through the first resistor R1 and first transistor Q1. The excess detecting signal has a level corresponding to a threshold voltage for turning on the first transistor Q1.

In other word, if the first transistor Q1 of the first bypassing part 41 is maintained in a turned-off state, the electric current from the DC/AC inverter 20 is supplied to the first lamp L1. When the electric current at the output terminal of the first lamp L1 is detected exceeding a predetermined threshold value, the first transistor Q1 is turned-on in response to the excess detecting signal, so that a part of the electric current supplied to the first lamp L1 is pulled down to the ground by means of the first resistor R1. A range of the pull-down varies in association with resistance of the first resistor R1.

In general, a power supply system for an LCD device pulls up a voltage level of input current supplied to lamps for the LCD device in case that a voltage level of current flowing through lamps is lower than a predetermined level, and pulls down the voltage level of input current supplied to the lamps in case that the voltage level of current flowing through the lamps is higher than the predetermined level. Thus, it is a disadvantage of such a power supply system that the level of input current supplied to all the lamps is controlled based on the level of the electric current flowing through only one lamp.

In contrast, in this embodiment of the present invention, the first to fourth bypassing parts 41, 42, 43 and 44 are connected to the first to fourth lamps L1, L2, L3 and L4, respectively, so that the amount of the electric current supplied to each of the first to fourth lamps L1, L2, L3 and L4 is controlled by bypassing a part of the electric current to the ground. That is, the electric current supplied to the first to fourth lamps L1, L2, L3 and L4 is respectively controlled by the first to fourth bypassing parts 41, 42, 43 and 44, thereby preventing the first to fourth lamps L1, L2, L3 and L4 from being damaged.

As described above in this embodiment, the four lamps are arranged in parallel with each other. However, multiple lamps less or more than four may also be arranged in parallel in a like manner. Also, the lamp driving apparatus of the present invention may employ a plurality of DC/DC converters and DC/AC inverters in which a pair of DC/DC converter and DC/AC inverter drives a certain number of the lamps. In this case, the lamps for an LCD device are divided into units each having a certain number of lamps, and one of the DC/DC converters and one of the DC/AC inverters are connected with corresponding one of the units. Moreover, the lamp driving apparatus of the present invention can be applied to an LCD device with a backlight assembly that adopts an edge type light guide plate in which the lamps are disposed adjacent to the side portions of the light guide plate.

Figure 2:
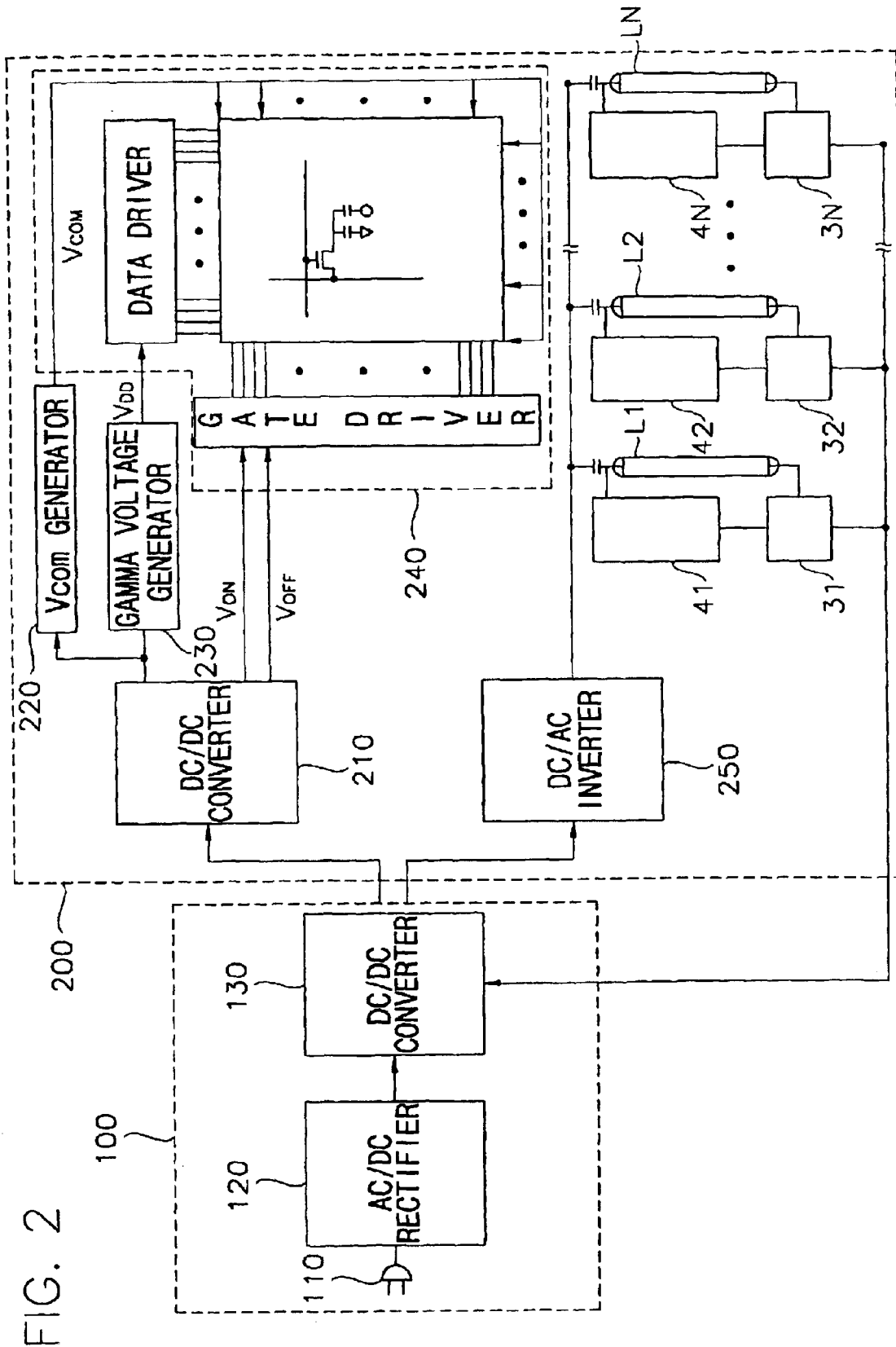
FIG. 2 is a block diagram showing a liquid crystal display device that adopts an external type DC power circuit according to the present invention.

FIG. 2 is a block diagram showing a liquid crystal display device according to the present invention in which an external type DC power circuit is employed.

Referring to FIG. 2, the liquid crystal display includes an external DC supply part 100 and an LCD module part 200. The external DC supply part 100 includes an input plug 110, an AC/DC rectifier 120, and a first DC/DC converter 130. The external DC supply part 100 converts AC externally supplied through the input plug 110 into DC and supplies the converted DC to the LCD module part 200.

The AC/DC rectifier 120 has a function of the power factor correction (hereinafter, referred to as "PFC"). In particular, the AC/DC rectifier 120 rectifies a general-purpose AC voltage signal having, for example, 100 to 240 volts supplied through the plug 110 into a DC voltage signal and supplies the converted DC voltage signal to the first DC/DC converter 130. For example, a diode rectifier or an active PWM (pulse width modulation) rectifier is used as the AC/DC rectifier 120.

The first DC/DC converter 130 pulls up or down the level of the converted DC voltage signal from the AC/DC rectifier 120 and supplies the converted DC voltage to the LCD module part 200. The pull-up or -down of a level of the converted DC voltage is determined based on electric current flowing through lamps of a backlight assembly disposed under the LCD panel.

The LCD module part 200 includes a second DC/DC converter 210, a common electrode voltage generator 220, a gamma voltage generator 230, an LCD panel part 240, a DC/AC inverter 250, a plurality of lamps L1–LN, a plurality of electric current detecting parts 31–3LN each connected to corresponding one of the lamps L1–LN, and a plurality of bypassing parts 41–4N each connected to corresponding one of the lamps L1–LN. The LCD module part 200 receives the DC signal from the external DC supply part 100 and displays an image based on data from a graphic controller (not shown).

Particularly, the second DC/DC converter 210 converts the DC signal from the first DC/DC converter 130 into DC signals having different levels with each other and provides the DC signals to the common electrode voltage generator 220, the gamma voltage generator 230 and the LCD panel part 240, respectively. For example, a boost converter, a buck converter, a half-bridge converter, a fly-back converter, a full-bridge converter, a push-full converter, a forward converter, or the like can be used as the second DC/DC converter 210.

The common electrode voltage generator 220 generates a common electrode voltage Vcom in response to a DC signal from the second DC/DC converter 210 and supplies the common electrode voltage Vcom to the LCD panel part 240. The DC signal supplied from the second DC/DC converter 210 to the common electrode voltage generator 220 serves as a power source signal for driving the common electrode voltage generator 220.

The gamma voltage generator 230 generates a gamma voltage $V_{DD}$ in response to a DC signal from the second DC/DC converter 210 and provides the gamma voltage $V_{DD}$ to the LCD panel part 240. The DC signal supplied from the second DC/DC converter 210 to the gamma voltage generator 230 serves as a reference power source of the gamma voltage generator 230. The common electrode voltage generator 220 and the gamma voltage generator 230 may also be integrally formed in the LCD panel part 240.

The LCD panel part 240 includes a data driver, a gate driver and an LCD panel. The LCD panel part 240 displays images based on data externally provided through a graphic controller (not shown) in response to a timing signal from a timing controller (not shown).

In the liquid crystal display that adopts the external DC supply part formed outside the LCD module part as shown in FIG. 2, when the level of the electric current flowing through the plurality of lamps L1–LN exceeds a predetermined value (e.g., a level of a reference current), the external DC supply part controls the level of the electric current supplied to the plurality of lamps L1–LN and a part of the electric current supplied to the plurality of lamps L1–LN is bypassed to the ground through the bypassing parts 41–4N, thereby preventing the plurality of lamps L1–LN from being damaged.

Also, the above-described lamp driving apparatus can be applied to a liquid crystal display device in which an internal type DC supply part is formed within an LCD module part.

Figure 3:
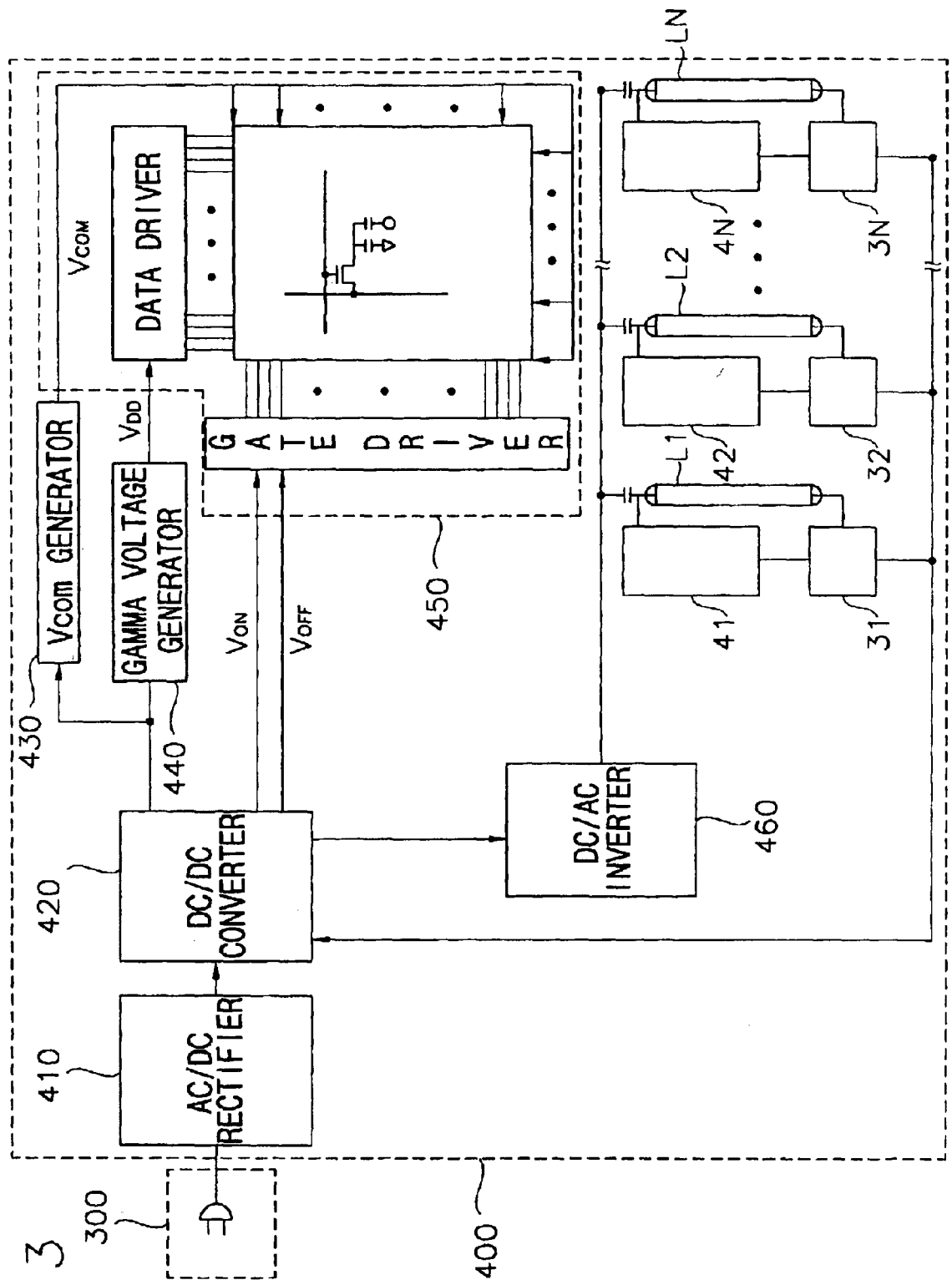
FIG. 3 is a block diagram showing a liquid crystal display that adopts an internal type DC power circuit according to the present invention.

FIG. 3 is a block diagram showing a liquid crystal display that adopts an internal type DC supply part according to the present invention.

Referring to FIG. 3, the liquid crystal display includes an AC input part 300 and an LCD module part 400. The AC input part 300 directly supplies the general-purpose AC voltage having, for example, 100 to 240 volts to the LCD module part 400. The AC input part 300 can supply the general-purpose AC to the LCD module part 400 by plugging a plug into a socket.

The LCD module part 400 includes an AC/DC rectifier 410, a DC/DC converter 420, a common electrode voltage generator 430, a gamma voltage generator 440, an LCD panel part 450, a DC/AC inverter 460, a plurality of lamps L1–LN, a plurality of electric current detecting parts 31–3LN connected to corresponding one of the lamps L1–LN, and a plurality of bypassing parts 41–4N connected to corresponding one of the lamps L1–LN. The LCD module part 400 receives the general-purpose AC voltage from the AC input part 300 and displays an image based on data from a graphic controller (not shown).

Particularly, the AC/DC rectifier 410 rectifies the general-purpose AC voltage having, for example, 100 to 240 volts supplied through the AC input part 300 into a DC voltage and supplies the rectified DC voltage to the DC/DC converter 420. For example, a diode rectifier or an active PWM rectifier is used as the AC/DC rectifier 420.

The DC/DC converter 420 converts the rectified DC voltage from the AC/DC rectifier 410 into DC signals having different levels with each other and provides the DC signals to the common electrode voltage generator 430, the gamma voltage generator 440 and the LCD panel part 450, respectively. For example, a boost converter, a buck converter, a half-bridge converter, a fly-back converter, a full-bridge converter, a push-full converter, a forward converter, or the like can be used as the DC/DC converter 420.

The common electrode voltage generator 430 generates a common electrode voltage Vcom in response to a DC signal from the DC/DC converter 420 and supplies the common electrode voltage Vcom to the LCD panel part 450. The DC signal supplied from the DC/DC converter 420 to the common electrode voltage generator 430 serves as a power source signal for driving the common electrode voltage generator 430.

The gamma voltage generator 440 generates a gamma voltage $V_{DD}$ in response to the DC signal from the DC/DC converter 420 and provides the gamma voltage $V_{DD}$ to the LCD panel part 450. The DC signal supplied from the DC/DC converter 420 to the gamma voltage generator 440 serves as a reference power source of the gamma voltage generator 440. The common electrode voltage generator 430 and gamma voltage generator 440 may also be integrally formed in the LCD panel part 450.

The LCD panel part 450 includes a data driver, a gate driver and an LCD panel. The LCD panel part 450 displays images based on data externally provided through a graphic controller (not shown) in response to a timing signal from a timing controller (not shown).

The DC/AC inverter 460 inverts a DC signal generated from DC/DC converter 420 into an AC signal. The AC signal output from the DC/AC inverter 460 has a high level within a range of, for example, 500 to 600 volts that is suitable to the lamps L1–LN. Any inverter operating with the high voltage within the range of, for example, 500 to 600 volts can be used as the DC/AC inverter 460. For example, a royer inverter, a push-pull inverter, a half-bridge inverter, a full-bridge inverter, or the like may be used as the DC/AC inverter 460.

In this embodiment, the DC/AC inverter 460 which inverts the high-voltage DC signal into the AC signal is disposed within the LCD module part 400, so that the liquid crystal display device may employ a transformer having a coil with the number of turns smaller than that of a coil in a conventional liquid crystal display device. Moreover, the liquid crystal display device according to the present invention can employ the DC/AC inverter without a transformer. Thus, the cost for the liquid crystal display device may be reduced.

The lamps L1–LN are disposed under the LCD panel or adjacent to side portions of the LCD panel and illuminates light to the LCD panel in response to the AC voltage.

The electric current detecting parts 31–3LN detect the electric current flowing through the lamps L1–LN, respectively. When the level of the detected electric current exceeds a predetermined threshold value (e.g., a level of a reference electric current), corresponding one or more of the electric current detecting parts 31–3LN each generate an excess detecting signal to the DC/DC converter 420 to control the level of the DC supplied to the DC/AC inverter 460 and activates the bypassing parts 41–4N to reduce the level of the AC supplied to the lamps L1–LN.

According to the above-mentioned lamp driving apparatus and liquid crystal display having the same of the present invention, the DC electric current flowing through the lamps is detected by the electric current detecting parts. When the level of the DC electric current flowing through the lamps exceeds a predetermined threshold value, the bypassing parts each bypass a part of the DC electric current supplied to the lamps to the ground, thereby decreasing the amount of the DC electric current supplied to the lamps and preventing the lamps from being damaged.

Further, the lamp driving apparatus according to the present invention is easily applied not only to the liquid crystal display that adopts the external type DC power circuit such as a mobile computer, but also to the liquid crystal display having the internal type DC power circuit internally adopted into a monitor.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. An apparatus for driving a lamp, the apparatus comprising:
    a DC/DC converter for converting a DC input signal into a converted DC signal having a voltage level;
    a DC/AC inverter for inverting the converted DC signal into an AC signal to supply the inverted AC signal to an input terminal of the lamp; and
    a power controller for detecting electric current at an output terminal of the lamp to generate a feedback signal to control the voltage level of the converted DC signal output from the DC/DC converter and bypassing a part of the inverted AC signal applied to the input terminal of the lamp to a ground when a level of the detected electric current is higher than a predetermined threshold value.

2. The apparatus for driving a lamp of claim 1, wherein the power controller comprises:
    an electric current detecting means for detecting the electric current at the output terminal of the lamp, the electric current detecting means having a first terminal connected to the output terminal of the lamp, a second terminal outputting the feedback signal to the DC/DC converter, and a third terminal outputting a detecting signal indicating that the detected electric current level is higher than the predetermined threshold value; and
    a bypassing means for bypassing the part of the inverted AC signal supplied to the input terminal of the lamp in response to the detecting signal from the electric current detecting means.

3. The apparatus for driving lamp of claim 2, wherein the bypassing means comprises a switching means connected between the input terminal of the lamp and said ground, for bypassing the part of the inverted AC signal supplied to the input terminal of the lamp to the ground in response to the detecting signal from the electric current detecting means.

4. The apparatus for driving lamp of claim 3, wherein the bypassing means further comprises a second resistor of which a first terminal is connected to the electric current detecting means and a second terminal is connected to the switching means.

5. The apparatus for driving lamp of claim 4, wherein the bypassing means further comprises a third resistor of which a first terminal is connected to the second terminal of the second resistor and a second terminal is connected to the ground.

6. The apparatus for driving lamp of claim 3, wherein the switching means includes a transistor having an electric conduction path between the input terminal of the lamp and the ground, the transistor being turned on or off in response to the detecting signal from the electric current detecting means.

7. The apparatus for driving lamp of claim 6, wherein the switching means further includes a first resistor connected between the input terminal of the lamp and the ground to form the conduction pass;

bypassing means further comprises a first resistor, the first resistor having a first terminal connected with the input terminal of the lamp and a second terminal the ground.

8. The apparatus for driving lamp of claim 2, wherein the electric current detecting means comprises:
    a resistor connected between the output terminal of the lamp and the ground;
    a first diode connected between the output terminal of the lamp and the ground in parallel with the resistor; and
    a second diode connected between the output terminal of the lamp and the third terminal of the electric current detecting means.

9. A liquid crystal display comprising:
    a liquid crystal display panel for displaying an image;
    a plurality of lamps for providing light to the liquid crystal display panel; and
    a lamp driving means for converting a voltage level of an externally supplied input signal to provide a converted signal to the plurality of lamps, and bypassing an excessive part of the converted signal provided to the plurality of lamps to prevent the plurality of lamps from being damaged by the excessive part,
    wherein the lamp driving means includes:
        a power converter for converting a DC signal into an AC signal to supply the converted AC signal to an input terminal of each of the plurality of lamps; and
        a power controller for detecting electric current at an output terminal of a lamp and bypassing a part of the converted AC signal applied to the input terminal of the lamp to a ground when a level of the detected electric current is higher than a predetermined threshold value.

10. The liquid crystal display of claim 9, wherein the power controller is provided for each of the plurality of lamps.

11. The liquid crystal display of claim 9, wherein the plurality of lamps are disposed under the liquid crystal display panel.

12. The liquid crystal display of claim 9, wherein the plurality of lamps are disposed adjacent to a side portion of the liquid crystal display panel.

13. The liquid crystal display of claim 9, wherein the power converter comprises:
    a DC/DC converter for converting the DC signal into a converted DC signal with a converted voltage level; and
    a DC/AC inverter for inverting the converted DC signal into the converted AC signal to be supplied to the input terminal of each of the lamps.

14. The liquid crystal display of claim 13, wherein the power controller comprises:
    an electric current detecting means for detecting the electric current at the output terminal of the lamp, the electric current detecting means having a first terminal connected to the output terminal of the lamp, a second terminal outputting a feedback signal to the DC/DC converter to control the converted voltage level of the converted DC signal, and a third terminal outputting a detecting signal indicating that the detected electric current level is higher than the predetermined threshold value; and
    a bypassing means for bypassing the part of the inverted AC signal supplying to the input terminal of the lamp in response to the detecting signal from the electric current detecting means.

15. The liquid crystal display of claim 14, wherein the bypassing means comprises a switching means connected between the input terminal of the lamp and ground, for bypassing the part of the inverted AC signal supplied to the input terminal of the lamp to the ground in response to the detecting signal from the electric current detecting means.

16. The liquid crystal display of claim 15, wherein the bypassing means further comprises a second resistor of which a first terminal is connected to the electric current detecting means and a second terminal is connected to the switching means.

17. The liquid crystal display of claim 16, wherein the bypassing means further comprises a third resistor of which a first terminal is connected to the second terminal of the second resistor and a second terminal is connected to the ground.

18. The liquid crystal display of claim 15, wherein the switching means includes a transistor having an electric conduction path between the input terminal of the lamp and the ground, the transistor being turned on or off in response to the detecting signal from the electric current detecting means.

19. The apparatus for driving lamp of claim 18, wherein the switching means further includes a first resistor connected between the input terminal of the lamp and the ground to form the conduction pass.

* * * * *